United States Patent [19]
Akao

[11] 4,411,943
[45] Oct. 25, 1983

[54] FRICTION SHEET
[75] Inventor: Mutsuo Akao, Kanagawa, Japan
[73] Assignee: Fuji Photo Film Co., Ltd., Kanagawa, Japan
[21] Appl. No.: 299,422
[22] Filed: Sep. 4, 1981
[30] Foreign Application Priority Data
Sep. 5, 1980 [JP] Japan .................. 55-123068
[51] Int. Cl.³ .................. B32B 3/00; B32B 23/08
[52] U.S. Cl. .................... 428/161; 428/215; 428/409; 428/513
[58] Field of Search ........... 428/694, 695, 900, 409, 428/161, 513, 215; 206/387, 389, 397
[56] References Cited
U.S. PATENT DOCUMENTS
2,378,445  6/1945  Soday .................. 428/513
4,064,302 12/1977  Kozlowski et al. ........ 428/513
4,147,291  4/1979  Akao et al. ............. 229/55
4,164,604  8/1979  Tamai et al. ............ 428/694
4,247,588  1/1981  Thompson et al. ........ 428/513

FOREIGN PATENT DOCUMENTS
55-156057 12/1980  Japan ................. 428/513
1194859  6/1970  United Kingdom .

Primary Examiner—William R. Dixon, Jr.
Attorney, Agent, or Firm—Sughrue, Mion, Zinn, Macpeak & Seas

[57] ABSTRACT

A friction sheet comprising a flexible support which is embossed at one side, and at least one high density polyethylene film bonded onto the embossed surface of the flexible support. This friction sheet is suitable to be provided on an inner surface of a case which is subject to sliding contact with a tape roll accommodated in the case.

15 Claims, 10 Drawing Figures

FRICTION SHEET

FIELD OF THE INVENTION

The present invention relates to a friction sheet (i.e., a sheet intended to minimize friction), and more particularly, to a friction sheet suitable to be provided on an inner surface of a case containing a tape roll and a friction sheet which is subject to sliding contact with a tape roll accommodated in the case.

BACKGROUND OF THE INVENTION

The term "tape roll" is used in the present invention to indicate a flexible, narrow, long band-like member, such as a magnetic tape, e.g., a video tape or an audio tape, or a movie film, e.g., Single 8, Super 8, etc. which is wound in the form of a roll.

Tape rolls are usually placed in a case referred to as a cassette or magazine (cartridge), and are wound and re-wound in the case. Between the tape roll and an inner surface of the case, therefore, friction may be produced, preventing the tape from running smoothly. Thus, a material having a low frictional resistance, generally called a friction sheet, is fixed or rotatably provided on the inner surface of the case which is subject to sliding contact with the tape roll.

It is therefore required for such friction sheets to have a low coefficient of friction, good abrasion resistance, and dimensional stability, and, sometimes, antistatic properties.

Friction sheets which have heretofore been known include a fluorine resin sheet, a silicone-processed or wax-processed paper, a sheet prepared by incorporating a fluorine compound into the surface of a thermoplastic resin film, as described in Japanese Patent Application (OPI) No. 145482/75 (the term "OPI" as used herein refers to a "published unexamined Japanese patent application"), and a sheet coated with at least one of a low molecular weight polyethylene or an alkyl sulfate sodium salt as described in Japanese Utility Model Publication No. 2858/68.

These conventional friction sheets, however, are not always satisfactory in abrasion resistance and surface stability. In particular, friction sheets containing fluorine have the disadvantages that the moldability is poor, and production costs are high because of expense of fluorine.

Furthermore, friction sheets which have been known in recent years include a sheet consisting of a single layer comprising a uniaxially or biaxially oriented high density polyethylene film as described in German Patent Application No. 3111330 (which refers to U.S. patent application Ser. No. 247,030, filed Mar. 24, 1981). Such friction sheets have been expected to be additionally improved in coefficient of friction and abrasion resistance properties, and more economical.

SUMMARY OF THE INVENTION

The principal object of the invention is to provide a friction sheet which is free from the foregoing disadvantages of conventional friction sheets, which should have a low coefficient of friction, good abrasion resistance and dimensional stability, and antistatic properties, and which can be prepared at low cost.

It has been found that these objects can be attained by embossing a flexible support on the side which will be subject to sliding contact with a tape roll, and bonding onto the embossed flexible support a uniaxially oriented high density polyethylene film composed mainly of a high density polyethylene having a density of at least 0.94 g/cm$^3$.

The invention, therefore, comprises a friction sheet for an inner surface of a case containing a tape roll and a friction sheet which is subject to sliding contact with a tape roll accommodated in the case, said friction sheet comprises a flexible support embossed on the side thereof which is subject to sliding contact the tape roll and at least one uniaxially oriented high density polyethylene film composed mainly of a high density polyethylene having a density of at least 0.94 g/cm$^3$ bonded onto the embossed surface of the flexible support.

DETAILED DESCRIPTION OF THE INVENTION

Hereinafter, the invention is described in detail by reference to the accompanying drawings.

Figure 1:
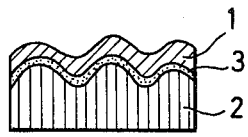
FIG. 1 is a cross-sectional view of a preferred embodiment of a friction sheet according to the present invention.

FIG. 1 is a cross-sectional view of a preferred embodiment of the friction sheet of the present invention; this friction sheet comprises a uniaxially orientated high density polyethylene film 1 having a density of at least 0.94 g/cm$^3$, a flexible support 2 which is embossed at the side being subject to sliding contact with a tape roll (not shown), and an adhesive layer 3 bonding together the high density polyethylene film 1 and the flexible support 2.

The thickness of the high density polyethylene film 1 is preferably from about 10 to 200μ and more preferably from 20 to 70μ. Uniaxial orientation of such high density polyethylene films may be performed in any of the longitudinal, lateral and oblique directions based on the feeding direction of the film.

These uniaxially oriented high density polyethylene films can be produced by those methods generally well known in the art, for example, a T-die process or an inflation process, wherein an orifice is narrowed, an extruded film is wound at a rate higher than the extrusion rate, an extruded film is brought into contact with a rotary mandrel to be orientated, an extruded film is gradually cooled, a blow ratio is increased, or a formed film is stretched, and an extrusion process wherein analogous procedures as described for the T-die and inflation processes are employed.

The T-die and inflation processes noted above can be defined as follows:

(i) The T-die process refers to a process for preparing a flat film by extruding a resin from narrow orifice. The name of this process is based on the shape of the die.

(ii) LThe inflation method refers to a process for preparing a film having the form of cylinder by extruding a resin from a circular orifice. The film extruded as a cylinder is expanded by air supplied from a center part of the circular orifice controlled to achieve a desired size; then it is passed between a pair of pinch rolls, and then wound.

In the inflation method, the preparation of the high density polyethylene film oriented in an oblique direction (with respect to the direction of extrusion) is performed by twisting the film having the cylindrical form during extrusion or immediately after the film is extruded.

The high density polyethylene for these uniaxially oriented high density polyethylene films may be substituted for a low molecular weight polyethylene, polybutene, polyisobutene, etc. within a total amount of less than 10% by weight, based on the weight of the uniaxially oriented high density polyethylene film.

The flexible support 2 is made of paper, a coated paper, an aluminum foil, a plastic film, cellophane, cloth, or the like. Known antistatic agents may be incorporated into the flexible support 2. The thickness of the flexible support 2 is usually from about 10 to 200μ although it may vary depending on the particular application for which the friction sheet is used. The flexible support 2 is embossed on the side being subject to sliding contact with the tape roll. The term "embossing" as used herein means the formation of unevennesses, from fine unevennesses to coarse unevennesses (preferably in a depth of from about 3 to 100μ, more preferably in a depth of from 5 to 60μ, and most preferably in a depth of from 10 to 50μ), in various patterns, such as textured, silk textured, and chase.

In other words, preferred examples with respect to the extent of embossment (the convex surface portions) per given surface area differ depending on the depth of embossment. For example, when the depth of embossment is 3 to 20μ, the extent of embossment (the convex surface portions) per given surface area is preferably from 5 to 90%, and more preferably from 10 to 80%, whereas when the depth of embossment is from 21 to 100μ, the extent of embossment (the convex surface portions) per given surface area is preferably from 10 to 95%, and more preferably from 50 to 90%.

The particular pattern of embossment is not limited.

The embossing is performed by the use of an embossing roll or embossing plate which is provided with the desired patterns. When the flexible support 2 is made of cloth, the texture of the cloth can be utilized as is. That is, in the case of a flexible support made of cloth, it is not always necessary to apply thereonto embossing. When the flexible support 2 is made of paper, a pigment-coated paper, an aluminum foil, or the like, a desired pattern is embossed with a suitable embossing machine during or after the production of the flexible support. In accordance with another embodiment, embossing may be applied immediately after bonding together the high density polyethylene film and the flexible support.

When the high density polyethylene film is adhered to the embossed surface of the flexible support, the adhesive layer being sandwiched between the high density polyethylene film and the flexible support, the resulting laminate is pressed from both sides thereof by means of a pair of rolls, one being made of rubber and the other being made of stainless steel (SUS), to be adhered without formation of airpockets.

For the preparation of the adhesive layer 3, thermoplastic resins such as low density polyethylene, EEA (ethylene-ethyl acetate copolymer), EVA (ethylene-vinyl acetate copolymer), and ionomers are preferred in view of general-purpose properties and cost. Of these thermoplastic resins, EEA is particularly preferred in view of antistatic properties. Addition of an antistatic agent, or a metal powder, such as an aluminum powder or an aluminum paste to the adhesive layer 3 can further increase the antistatic properties thereof.

The thermoplastic resins can be provided on the embossed surface of the flexible support 2 in the form of a layer by various methods. Of these methods, an extrusion coating method is particularly preferred, because it reduces production costs.

In addition to the extrusion coated layer of the foregoing thermoplastic resin, any material capable of adhering to the high density polyethylene film 1, such as a hot melt type adhesive, a pressure-sensitive adhesive, and a heat-sensitive adhesive, can be employed as the adhesive layer 3.

It has been found that the friction sheet of the present invention has a low coefficient of friction and excellent abrasion resistance and dimensional stability compared with the conventional friction sheets as described above. Furthermore, it has been confirmed that the use of EEA for the formation of the adhesive layer 3, or the addition of an antistatic agent, such as aluminum powder, to the adhesive layer 3, imparts antistatic properties.

One method of embossing the friction sheet of the present invention is, for example, a method in which after the high density polyethylene film 1 and the flexible support 2 are bonded together with the adhesive layer 3, a predetermined pattern is embossed on the surface of the high density polyethylene film 1 by the use of an embossing roll. This method, however, has the following disadvantages.

In accordance with the foregoing method wherein embossing is applied directly onto the uniaxially orientated high density polyethylene film 1, undesirable marks, such as flaws and scars forms on the surface of the film directly embossed to remain as undesirable marks and unevenness in luster thereon. Furthermore, in providing unevennesses having a relatively small depth depending on the application for which the friction sheet is used, feed marks are readily formed during the molding with the embossing roll, appearing on the surface of the friction sheet obtained as oblique streaks or stripes. The aforementioned "feed marks" refers to undesirable marks and unevenness in luster which occur due to slippage between the embossing roll or plate and the high density polyethlene film due to feeding unevenness of the embossing roll. Thus, the surface quality of the friction sheet is seriously deteriorated.

In order to overcome the above problem, it is necessary to apply a highly precise embossed-pattern onto the embossing roll, or to select a pattern suitable for overcoming the feeding unevenness. This is very difficult from a technical standpoint and increases the cost required for providing the embossed pattern onto the embossing roll.

On the other hand, in the friction sheet according to the present invention, the flexible support 2 is embossed in advance, and the embossed flexible support 2 is bonded together with the high density polyethylene film 1. The friction sheet of the present invention, therefore, is free from undesirable marks, such as flaws and scars, resulting from the undesirable marks formed in the embossing roll or plate. Thus, a friction sheet according to the present invention is advantageous over the friction sheet prepared by the foregoing method in that the surface quality is excellent and the production of the embossing roll or plate is not so critical.

Although the present invention has been described by reference to the embodiment as illustrated in FIG. 1, it is not limited thereto, and various modifications or variations as described hereinafter can be made thereto.

Figure 2:
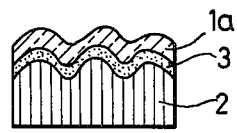
FIGS. 2 to 10 are cross-sectional views of other preferred embodiments of friction sheets according to the invention.
Figure 3:
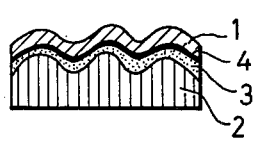
Figure 4:
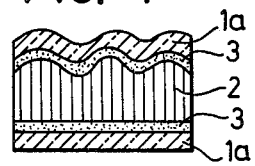
Figure 5:
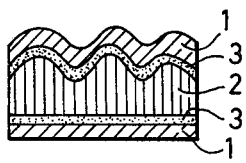
Figure 6:
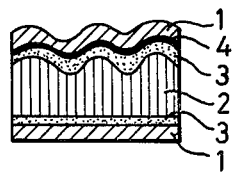
Figure 7:
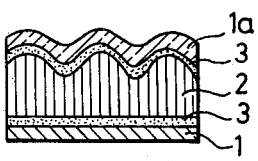
Figure 8:
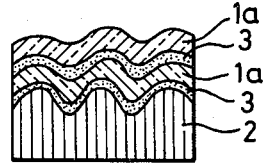
Figure 9:
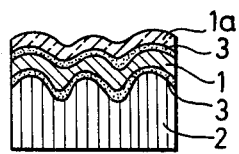
Figure 10:
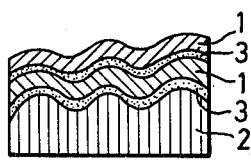

FIG. 2 is a cross-sectional view of another embodiment of a friction sheet according to the present invention, in which of the various characteristics required for the friction sheet, the antistatic properties, in particular, are enhanced.

Examples of friction sheets requiring, the anti-static properties include friction sheets for cassette tapes and 8 mm movie films. The reason for this is that when the friction sheet for cassette tapes is chargeable, magnetic powder and other dust attach onto the tape, deteriorating the sound quality of the tape; or, in the case of the friction sheet for 8 mm movie films, the formation of static marks due to static electricity as well as the attachment of photographic emulsion powder and other dusts occur, seriously deteriorate the image quality of the film.

In FIG. 2, the reference numeral 1a indicates a layer providing antistatic properties to the high density polyethylene film 1.

Methods of imparting the antistatic properties include a method in which known antistatic agents, such as carbon black and surface active agents (i.e., anionic, nonionic, cationic, and amphoteric surface active agents commercially available) are incorporated into the high density polyethylene film 1, and a method in which metal powders, such as an aluminum powder, an aluminum paste, a zinc powder, a tin oxide powder, or a magnesium oxide powder, is dispersed in the high density polyethylene film 1 by conventional method.

Preferred commercially available examples of the surface active agents include fatty acid amide derivatives such as Elegan P100 (which is a trade name for a product manufactured by Nippon Oils & Fats Co., Ltd.) etc. as nonionic surface active agents, amido-type cationic quaternary ammonium salts such as Electrostipper ES (which is a trade name for a product manufactured by Kao Soap Co., Ltd.) etc. as cationic surface active agents, and imidazoline-type metal salt such as Reostat 826,923 (which is a trade name for a product manufactured by Kao Soap Co., Ltd.) etc. as amphoteric surface active agents. Aluminum paste as used herein can be prepared by adding a white spirit and a small amount of stearic acid in preparing an aluminum powder by a ball milling method.

Methods for incorporating the antistatic agents or metal powders are, for example, as follows:

(i) A method comprising covering polyethylene pellets with a desired amount of the antistatic agents or metal powders, fusing a melt of the pellets, obtained by heating, and further processing the melt to form pellets.

(ii) A method comprising preparing pellets containing the antistatic agents or metal powders in the analogous manner as the method described above, mixing pellets containing neither antistatic agent nor metal powder therewith in a desired ratio, and melting these pellets.

(iii) A method comprising simply mixing polyethylene pellets with a desired amount of the antistatic agents or metal powdes (without preparing pellets) to prepare a mixture.

The uniaxially oriented high density polyethylene film is prepared from the resulting polyethylene pellets or a mixture as described above. However, when the aluminum paste is incorporated, the uniaxially oriented high density polyethylene film is prepared after a solvent included in the aluminum paste is removed from the resulting polyethylene pellets or a mixture as described above.

Also if desired, lubricants such as silicone, e.g., dimethyl polysiloxane, paraffins, higher alcohols, aliphatic acids, and aliphatic acid salts, inorganic pigments, such as calcium carbonate, talc, clay, barium sulfate, and titanium oxide, and colored dyes may be added to the monoaxially orientated high density polyethylene film 1 or 1a.

The friction sheet having the construction as described above is, of course, excellent in characteristics such as low friction, abrasion resistance and dimensional stability, and in particular, is superior in antistatic properties to the friction sheet as illustrated in FIG. 1.

FIGS. 3 to 10 are cross-sectional views of other embodiments of friction sheets according to the present invention. In these figures, the reference numeral 4 indicates an aluminum vapor-deposited layer provided to increase the antistatic properties, dimensional stability and so forth of the friction sheet. Although these modified friction sheets have somewhat more complicated layer constructions on the purposes and uses, they are fundamentally composed of a flexible support 2 which is embossed at the side which is subject to sliding contact with a tape roll and a uniaxially orientated high density polyethylene film 1 or 1a bonded thereto through an adhesive layer 3, and there is no material difference between these modified friction sheets and the friction sheets illustrated in FIGS. 1 and 2. In cases wherein two uniaxially oriented polyethylene films are used, it is preferred that the directions of orientation form an angle of 45° to 90°.

The following example is given to illustrate the present invention in greater detail.

EXAMPLE

A 45μ thick high density polyethylene film prepared by orienting a resin film of high density polyethylene having a density of 0.96 g/m$^3$ and containing 5wt% carbon black uniaxially in an oblique direction was bonded through a 20μ thick ethylene-ethyl acrylate copolymer layer to a 50 g/m$^2$ unbleached kraft paper were grooves had been embossed at 1 mm infervals to a depth of 30μ in a longitudinal direction to thereby prepare a friction sheet of the present invention as illustrated in FIG. 2.

For comparison, a 110μ thick conventional friction sheet was prepared by providing a 10μ thick silicon layer on the surface of a paper support with carbon black added to the paper support.

These friction sheets were compared in characteristics as described hereinafter and in production cost. The results are shown in Table 1.

Ease of Sliding

Two parts were cut out from the friction sheet. One of the parts was adhered to the bottom of a block, and the other part was adhered to a slant surface. The block was placed on the slant surfce, and the angle of the slant surface relative to the ground was changed. The angle at which the block began to slide was determined.

Surface Strength

Determined by JIS Z-0200-1976.

Abrasion Resistance

The friction sheet was used as a friction sheet for a cassette tape. After running the tape forward backward 30 times at normal speed in the cassette, the coarseness of the tape was observed.

Antistatic Properties

A part of the friction sheet was cut out and adhered onto an endless belt. The endless belt bearing the part of the friction sheet was passed between opposed rolls (an upper roll made of nylon and a lower roll made of stainless steel (SUS) under a load of 500 g at a rate of 2 m/minute, and the quantity of electric charge accumulated thereon was measured with a voltmeter.

Production Costs

Production costs per unit area of the friction sheets were determined.

TABLE 1

| Characteristics | Conventional Friction Sheet | | Friction Sheet According to This Invention | |
|---|---|---|---|---|
| Ease of Sliding | C | (18°) | A | (10°) |
| Surface Strength | C | | A | |
| Abrasion Resistance | C | | A | |
| Antistatic Properties | C | (500 V) | B | (100 V) |
| Relative Production Costs | 100 | | 70 | |

The symbols used in the Table above are as follows:
C Acceptable for practical use
B Good
A Very good As described above, friction sheets according to the present invention have a low coefficient of friction and are superior in abrasion resistance and antistatic properties compared with conventional friction sheets, and furthermore, can be produced at low cost. Thus, friction sheets according to the present invention have a very high practical value. By using flexible supports (made of paper, a coated paper, an aluminum foil, cloth, or the like) having high heat-stability, heat-shrinkage and curling of the uniaxially orientated high density polyethylene film during the bonding thereof could be reduced.

While the invention has been described in detail and with reference to specific embodiments thereof, it will be apparent to one skilled in the art that various changes and modifications can be made therein without departing from the spirit and scope thereof.

What is claimed is:

1. A friction sheet for an inner surface of a case containing a tape roll and a friction sheet which is subject to sliding contact with a tape roll accommodated in the case, said friction sheet comprising a flexible support regularly embossed on the side thereof intended for contact with the tape roll and at least one uniaxially orientated high density polyethylene film composed mainly of a high density polyethylene having a density of at least 0.94 g/cm$^3$ bonded onto the embossed surface of the flexible support.

2. A friction sheet as in claim 1, wherein the thickness of the flexible support is from about 10 to 200$\mu$ and the depth of the embossment is from about 3 to 100$\mu$.

3. A friction sheet as in claim 2, wherein the depth of embossment is from 5 to 60$\mu$.

4. A friction sheet as in claim 2, wherein the depth of embossment is from 10 to 50$\mu$.

5. A friction sheet as in claim 1, 2, 3, or 4, wherein the high density polyethylene film is a cross-laminated film composed of two uniaxially oriented high density polyethylene films which are disposed so that the direction of orientation of the two high density polyethylene films form an angle of from 45° to 90°.

6. A friction sheet as in claim 1, 2, 3, or 4, wherein the flexible support and the high density polyethylene film are bonded together with an ethylene-ethyl acrylate copolymer resin.

7. A friction sheet as in claim 1, 2, 3, or 4, wherein the thickness of the high density polyethylene film is from about 10 to 200$\mu$.

8. A friction sheet as in claim 1, 2, 3, or 4, wherein the thickness of the high density polyethylene film is from 20 to 70$\mu$.

9. A friction sheet as in claim 5, wherein the thickness of each of the polyethylene films is from about 10 to 200$\mu$.

10. A friction sheet as in claim 5, wherein the thickness of each of the polyethylene films is from 20 to 70 $\mu$.

11. A friction sheet as in claim 1, wherein the surface active agents are incorporated into the high density polyethylene film, the adhesive layer, or the flexible support.

12. A friction sheet as in claim 5, wherein the surface active agents are incorporated into the high density polyethylene film, the adhesive layer, or the flexible support.

13. A friction sheet as in claim 6, wherein the surface active agents are incorporated into the high density polyethylene film, the adhesive layer, or the flexible support.

14. A friction sheet as in claim 1, 2, 3 or 4, wherein two high density polyethylene films are laminated on both surfaces of the flexible support so that the directions of orientation of the two high density polyethylene films form an angle of from 45° to 90°.

15. A friction sheet as in claim 1, 2, 3 or 4, wherein flexible support is regularly embossed by an embossing roll or an embossing plate.

* * * * *